United States Patent
Krauss

(10) Patent No.: US 8,418,149 B2
(45) Date of Patent: Apr. 9, 2013

(54) DIFFERENTIAL COMPARISON SYSTEM AND METHOD

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1489 days.

(21) Appl. No.: 11/617,599

(22) Filed: Dec. 28, 2006

(65) Prior Publication Data

US 2008/0162888 A1    Jul. 3, 2008

(51) Int. Cl.
G06F 9/44    (2006.01)

(52) U.S. Cl.
USPC ............................. 717/133; 717/127; 717/132

(58) Field of Classification Search .................. None
See application file for complete search history.

(56) References Cited

U.S. PATENT DOCUMENTS

| | | | | |
|---|---|---|---|---|
| 5,805,795 A * | 9/1998 | Whitten | | 714/38.1 |
| 5,862,381 A * | 1/1999 | Advani et al. | | 717/125 |
| 5,966,541 A * | 10/1999 | Agarwal | | 717/132 |
| RE36,422 E | 11/1999 | Pazel | | |
| 6,014,514 A * | 1/2000 | Sistare | | 717/125 |
| 6,055,492 A * | 4/2000 | Alexander et al. | | 702/179 |
| 6,125,375 A | 9/2000 | Atkins et al. | | |
| 6,138,270 A * | 10/2000 | Hsu | | 717/125 |
| 6,223,338 B1 * | 4/2001 | Smolders | | 717/128 |
| 6,247,020 B1 | 6/2001 | Minard | | |
| 6,311,327 B1 * | 10/2001 | O'Brien et al. | | 717/114 |
| 6,349,406 B1 * | 2/2002 | Levine et al. | | 717/128 |
| 6,593,940 B1 | 7/2003 | Petersen et al. | | |
| 6,654,950 B1 | 11/2003 | Barnishan | | |
| 6,829,733 B2 | 12/2004 | Richardson et al. | | |
| 6,848,100 B1 * | 1/2005 | Wu et al. | | 717/157 |
| 7,028,223 B1 | 4/2006 | Kolawa et al. | | |
| 7,177,940 B1 * | 2/2007 | Holan et al. | | 709/231 |
| 7,280,877 B2 * | 10/2007 | Shioya et al. | | 700/17 |
| 7,392,514 B2 * | 6/2008 | Edwards | | 717/156 |
| 7,509,632 B2 * | 3/2009 | Boger | | 717/133 |
| 7,607,122 B2 * | 10/2009 | Hatlelid et al. | | 717/127 |
| 7,685,590 B2 * | 3/2010 | Venkatesan et al. | | 717/168 |
| 2002/0052856 A1 * | 5/2002 | Satoh | | 706/4 |
| 2003/0066055 A1 * | 4/2003 | Spivey | | 717/131 |
| 2003/0088853 A1 * | 5/2003 | Iida et al. | | 717/128 |
| 2003/0088854 A1 * | 5/2003 | Wygodny et al. | | 717/130 |
| 2004/0031020 A1 * | 2/2004 | Berry et al. | | 717/130 |
| 2004/0128658 A1 * | 7/2004 | Lueh et al. | | 717/151 |
| 2004/0194077 A1 * | 9/2004 | Bharadwaj et al. | | 717/158 |
| 2004/0205409 A1 * | 10/2004 | Wu et al. | | 714/38 |
| 2005/0065970 A1 * | 3/2005 | King et al. | | 707/102 |
| 2005/0183070 A1 * | 8/2005 | Alexander et al. | | 717/133 |

(Continued)

OTHER PUBLICATIONS

Lee et al., "A Development of Remote Tracepoint Debugger for Run-time Monitoring and Debugging of Timing Constraints on Qplus-P RTOS", IEEE Workshop on Software Technologies for Future Embedded Systems (WSTFES), 2003, pp. 1-4.

*Primary Examiner* — Jason Mitchell

(74) *Attorney, Agent, or Firm* — Holland & Knight LLP; Brian J. Colandreo, Esq.; Jeffrey T. Placker, Esq.

(57) ABSTRACT

A method and computer program product for monitoring the chronological order in which one or more portions of a first instance of a computer program are executed, thus generating a first data file. The chronological order in which one or more portions of a second instance of the computer program are executed is monitored, thus generating a second data file. The first and second data files are compared.

34 Claims, 7 Drawing Sheets

U.S. PATENT DOCUMENTS

| | | | |
|---|---|---|---|
| 2005/0183074 A1* | 8/2005 | Alexander et al. | 717/144 |
| 2005/0183075 A1* | 8/2005 | Alexander et al. | 717/144 |
| 2006/0053414 A1* | 3/2006 | Bhandari et al. | 717/133 |
| 2006/0101418 A1* | 5/2006 | Barsness et al. | 717/130 |
| 2006/0253465 A1* | 11/2006 | Willis et al. | 707/100 |
| 2008/0134148 A1* | 6/2008 | Clark | 717/128 |
| 2008/0178161 A1* | 7/2008 | Cates | 717/133 |
| 2010/0083234 A1* | 4/2010 | Rabin | 717/127 |

* cited by examiner

10

DIFFERENTIAL COMPARISON SYSTEM AND METHOD

TECHNICAL FIELD

This disclosure relates to run comparison tools and, more particularly, to system and methods that allow for side-by-side comparisons of multiple instances of a software application.

BACKGROUND

A typical problem faced by software developers is figuring out why their application program behaves inconsistently depending on how and where it runs. For example, the application in question may run fine on Windows 2000™ but may encounter heap corruption on Windows XP™. Or the application in question may run more slowly after a particular sequence of user activity. Or a menu item may mysteriously fail to get displayed if a seemingly unrelated setting or option is specified. These are but a few examples of various maladies that may plague a software application, either during development or in the field.

Traditionally, in order to address these issues, the software developer may reproduce the unexpected scenario while using a debugger. This may require the software developer to select one or more breakpoints at which the developer hopes to find clues about the misbehaving application. Unfortunately, given today's complex systems, selecting these breakpoints may prove challenging.

Further, sometimes two instances of the debugger are needed (running side by side) to step through a suspicious code sequence. Again, this methodology requires the selection of one or more breakpoints. The developer can use one instance of the debugger to step through the badly behaving instance of the program, while also using the other instance of the debugger for simultaneously stepping through the equivalent code sequence on a more properly behaving instance of the program. This practice allows the developer to explore the conditions that cause the behavior of the program to become different, for the two instances of the program. Unfortunately, this requires the developer to keep track of which run is associated with which debugger. It also requires the program's behavior to be deterministically repeatable, for both instances of the program, from one run to the next, because often during debugging the developer will "step past" the point where an unexpected event happens and must restart the two instances of the program under the two instances of the debugger to explore the causes of that unexpected event. Unfortunately, many complex programs do not always behave deterministically.

SUMMARY OF DISCLOSURE

In a first implementation of this disclosure, a differential comparison method includes monitoring the chronological order in which one or more portions of a first instance of a computer program are executed, thus generating a first data file. The chronological order in which one or more portions of a second instance of the computer program are executed is monitored, thus generating a second data file. The first and second data files are compared.

One or more of the following features may also be included. In response to the data file comparison, one or more differences between the chronological order in which one or more portions of the first instance of the computer program are executed and the chronological order in which one or more portions of the second instance of the computer program are executed may be identified.

One or more data values loaded and stored during execution of the first instance of the computer program may be identified. One or more data values loaded and stored during execution of the second instance of the computer program may be identified. One or more of a monitoring start point and a monitoring stop point within the first instance of the computer program may be identified. One or more of a monitoring start point and a monitoring stop point within the second instance of the computer program may be identified. One or more points of interest within the first data file may be identified. One or more points of interest within the second data file may be identified.

One or more portions of the first instance of the computer program may include one or more of lines of code, functions, and basic blocks. One or more portions of the second instance of the computer program may include one or more of lines of code, functions, and basic blocks.

One or more corresponding portions of the first data file and the second data file may be simultaneously displayed. Monitoring the chronological order in which one or more portions of the first instance of the computer program are executed may include: detecting invocation of a function; and determining whether a matching call graph entry exists for the function. If not, a call graph entry for the function may be generated.

Monitoring the chronological order in which one or more portions of the first instance of the computer program are executed may further include: determining whether one or more parameters of the function are to be stored and, if so, generating a data structure to store the one or more parameters of the function. Space may be allocated for tracking one or more descriptors for the set of basic blocks executed because of an invocation of the function.

Monitoring the chronological order in which one or more portions of the second instance of the computer program are executed includes: detecting invocation of a function; and determining whether a matching call graph entry exists for the function. If not, a call graph entry for the function may be generated.

Monitoring the chronological order in which one or more portions of the second instance of the computer program are executed may further include: determining whether one or more parameters of the function are to be stored. If so, a data structure may be generated to store the one or more parameters of the function. Space may be allocated for tracking one or more descriptors for the set of basic blocks executed because of an invocation of the function.

Monitoring the chronological order in which one or more portions of the first instance of the computer program are executed may includes: detecting entry of a basic block; and determining whether one or more stack variable changes or other loaded and stored values changes are to be stored. If so, space may be allocated for storing the one or more stack variable or other loaded and stored value changes.

Monitoring the chronological order in which one or more portions of the first instance of the computer program are executed may further include: determining whether one or more stack variables or other loaded and stored values changed. If so, a difference value may be stored and associated with the basic block. The execution of the basic block may be recorded as part of the basic block set descriptor associated with a particular call to a particular function tracked in the call graph.

Monitoring the chronological order in which one or more portions of the second instance of the computer program are executed may include: detecting entry of a basic block; and determining whether one or more stack variable changes or other loaded and stored value changes are to be stored. If so, space may be allocated for storing the one or more stack variable changes or other loaded and stored value changes.

Monitoring the chronological order in which one or more portions of the second instance of the computer program are executed may further includes: determining whether the one or more stack variables or other loaded and stored values changed and, if so, storing a difference value and associating the difference value with the basic block. The execution of the basic block may be recorded as part of the basic block set descriptor associated with a particular call to a particular function tracked in the call graph.

In another implementation of this disclosure, a computer program product includes a computer useable medium having a computer readable program. The computer readable program, when executed on a computer, causes the computer to monitor the chronological order in which one or more portions of a first instance of a computer program are executed, thus generating a first data file. The chronological order in which one or more portions of a second instance of the computer program are executed is monitored, thus generating a second data file. The first and second data files are compared.

One or more of the following features may also be included. In response to the data file comparison, one or more differences between the chronological order in which one or more portions of the first instance of the computer program are executed and the chronological order in which one or more portions of the second instance of the computer program are executed may be identified.

One or more data values loaded and stored during execution of the first instance of the computer program may be identified. One or more data values loaded and stored during execution of the second instance of the computer program may be identified. One or more of a monitoring start point and a monitoring stop point within the first instance of the computer program may be identified. One or more of a monitoring start point and a monitoring stop point within the second instance of the computer program may be identified. One or more points of interest within the first data file may be identified. One or more points of interest within the second data file may be identified.

One or more portions of the first instance of the computer program may include one or more of lines of code, functions, and basic blocks. One or more portions of the second instance of the computer program may include one or more of lines of code, functions, and basic blocks.

One or more corresponding portions of the first data file and the second data file may be simultaneously displayed. Monitoring the chronological order in which one or more portions of the first instance of the computer program are executed may include: detecting invocation of a function; and determining whether a matching call graph entry exists for the function. If not, a call graph entry for the function may be generated.

Monitoring the chronological order in which one or more portions of the first instance of the computer program are executed may further include: determining whether one or more parameters of the function are to be stored and, if so, generating a data structure to store the one or more parameters of the function. Space may be allocated for tracking one or more descriptors for the set of basic blocks executed because of an invocation of the function.

Monitoring the chronological order in which one or more portions of the second instance of the computer program are executed includes: detecting invocation of a function; and determining whether a matching call graph entry exists for the function. If not, a call graph entry for the function may be generated.

Monitoring the chronological order in which one or more portions of the second instance of the computer program are executed may further include: determining whether one or more parameters of the function are to be stored. If so, a data structure may be generated to store the one or more parameters of the function. Space may be allocated for tracking one or more descriptors for the set of basic blocks executed because of an invocation of the function.

Monitoring the chronological order in which one or more portions of the first instance of the computer program are executed may includes: detecting entry of a basic block; and determining whether one or more stack variable changes or other loaded and stored values changes are to be stored. If so, space may be allocated for storing the one or more stack variable or other loaded and stored value changes.

Monitoring the chronological order in which one or more portions of the first instance of the computer program are executed may further include: determining whether one or more stack variables or other loaded and stored values changed. If so, a difference value may be stored and associated with the basic block. The execution of the basic block may be recorded as part of the basic block set descriptor associated with a particular call to a particular function tracked in the call graph.

Monitoring the chronological order in which one or more portions of the second instance of the computer program are executed may include: detecting entry of a basic block; and determining whether one or more stack variable changes or other loaded and stored value changes are to be stored. If so, space may be allocated for storing the one or more stack variable changes or other loaded and stored value changes.

Monitoring the chronological order in which one or more portions of the second instance of the computer program are executed may further includes: determining whether the one or more stack variables or other loaded and stored values changed and, if so, storing a difference value and associating the difference value with the basic block. The execution of the basic block may be recorded as part of the basic block set descriptor associated with a particular call to a particular function tracked in the call graph.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
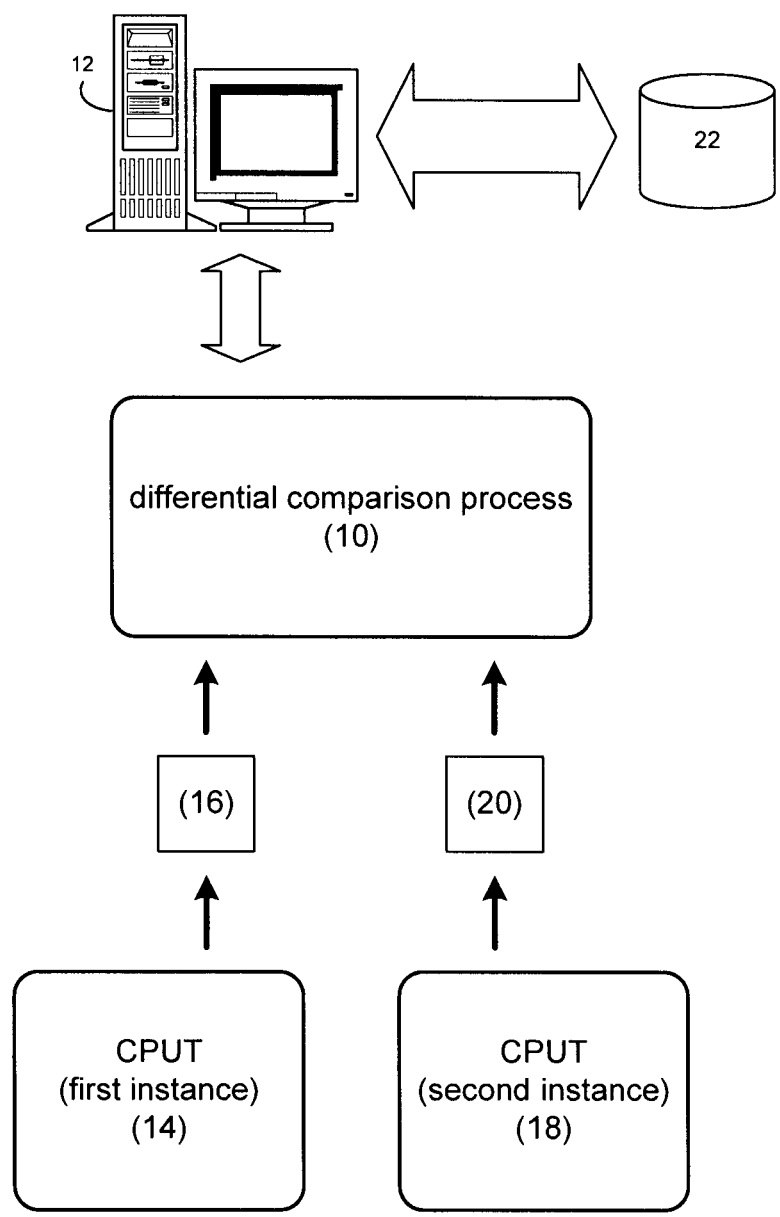
FIG. 1 is a diagrammatic view of a differential comparison process executed in whole or in part by a computer.

Overview:

As will be discussed below in greater detail, this disclosure may take the form of an entirely hardware embodiment, an entirely software embodiment or an embodiment containing both hardware and software elements. In a preferred embodiment, this disclosure may be implemented in software, which may include but is not limited to firmware, resident software, microcode, etc.

Furthermore, this disclosure may take the form of a computer program product accessible from a computer-usable or computer-readable medium providing program code for use by or in connection with a computer or any instruction execution system. For the purposes of this description, a computer-usable or computer readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks may include, but are not limited to, compact disc—read only memory (CD-ROM), compact disc—read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories that may provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The various functions described herein may be implemented within a software analysis tool. In one embodiment, for example, the various functions described herein may be implemented as extensions of one or more members of the Rational PurifyPlus family of software analysis tools that are commercially available from International Business Machines Corporation of Armonk, N.Y. (IBM). PurifyPlus is a family of computer programs that provide runtime analysis functionality to software developers and testers. In general, runtime analysis refers to the practice of analyzing and understanding application behavior using data collected during execution of a computer program under test, or CPUT.

The subject matter of this disclosure may include functionality for generating call graphs via runtime analysis. A tool called Quantify, for example, which is a member of the PurifyPlus product family, may produce viewable call graphs for a CPUT. In general, a viewable call graph may refer to a diagram that identifies the functions, methods, and/or modules in a system or computer program and shows which functions, methods, and/or modules invoke one another. A viewable call graph may also be referred to as a viewable call tree or a tier chart.

The various development activities that may be analyzed using PurifyPlus may include, but are not limited to, memory corruption detection and memory profiling in native C/C++ applications, memory profiling in Java and .NET managed code applications, performance profiling to identify slow or inefficient portions of code, code coverage analysis, and runtime tracing. PurifyPlus may also perform thread profiling. Thread profiling may entail inspecting and preventing intermittent hangs, data corruption, or performance degradation due to deadlocks, race conditions, and/or thread starvation.

The various functionality disclosed herein is intended to provide a basis for teaching one skilled in the art to better understand the concepts disclosed herein. It should be appreciated, however, that the present disclosure may be implemented as a standalone application, as part of a larger application, or in virtually any appropriately detailed structure, computer program, and/or portion thereof.

A data structure used to track the function parameters associated with a particular call to a function, during execution of a computer program under test, may be called a parameters data structure.

A data structure used to track the sequence of function calls, during execution of a computer program under test, may be called a stack frame data structure. A set of these data structures can be interlinked to represent the execution flow of the computer program under test as a directed graph, commonly known as a call graph or call tree.

Space may be allocated for tracking the parameters for a function at runtime, when the function is called. One or more of these data structures may be associated with the stack frame data structure that is in turn associated with a particular function tracked in the call graph.

A basic block may be a set of instructions, within a function, that run as a deterministic sequence. Once a basic block is entered, every instruction in the basic block may execute, unless an exception or program termination condition occurs. A data structure used to track the order of execution of the basic block within a function, during a particular call to that function, may be called a basic block set descriptor data structure. Space may be allocated for tracking a basic block set descriptor for a function at runtime, when the function is called. One or more of these data structures may be associated with the stack frame data structure that is in turn associated with a particular function tracked in the call graph.

This disclosure provides a runtime analysis tool (or a portion thereof) for evaluating a computer program under test, or CPUT. The CPUT may be executed a plurality of times and, during each execution, the runtime analysis tool may generate and store data files that may define the discrete operations of the CPUT during the execution in question. By comparing and analyzing these data files, information may be obtained concerning the cause of any inconsistent behavior between the various executions of the CPUT.

Differential Comparison Process

Referring to FIG. 1, there is shown a differential comparison process 10 resident on (in whole or in part) and executed by (in whole or in part) analysis computer 12 (e.g., a single server computer, a plurality of server computers, or a general purpose computer, for example). As will be discussed below in greater detail, differential comparison process 10 may monitor the chronological order in which one or more portions (e.g., one or more lines of code, functions, and basic blocks) of a first instance 14 of a CPUT are executed, thus generating first data file 16. The chronological order in which one or more portions (e.g., one or more lines of code, functions, and basic blocks) of a second instance 18 of the CPUT are executed may be monitored, thus generating second data file 20. First and second data files 16, 20 may be compared to identify differences in first and second data files 16, 20.

The instruction sets and subroutines of differential comparison process 10, which may be stored on a storage device 22 coupled to computer 12, may be executed by one or more processors (not shown) and one or more memory architectures (not shown) incorporated into computer 12. Storage device 22 may include, but is not limited to, a hard disk drive, a tape drive, an optical drive, a RAID array, a random access memory (RAM), or a read-only memory (ROM).

Figure 2:
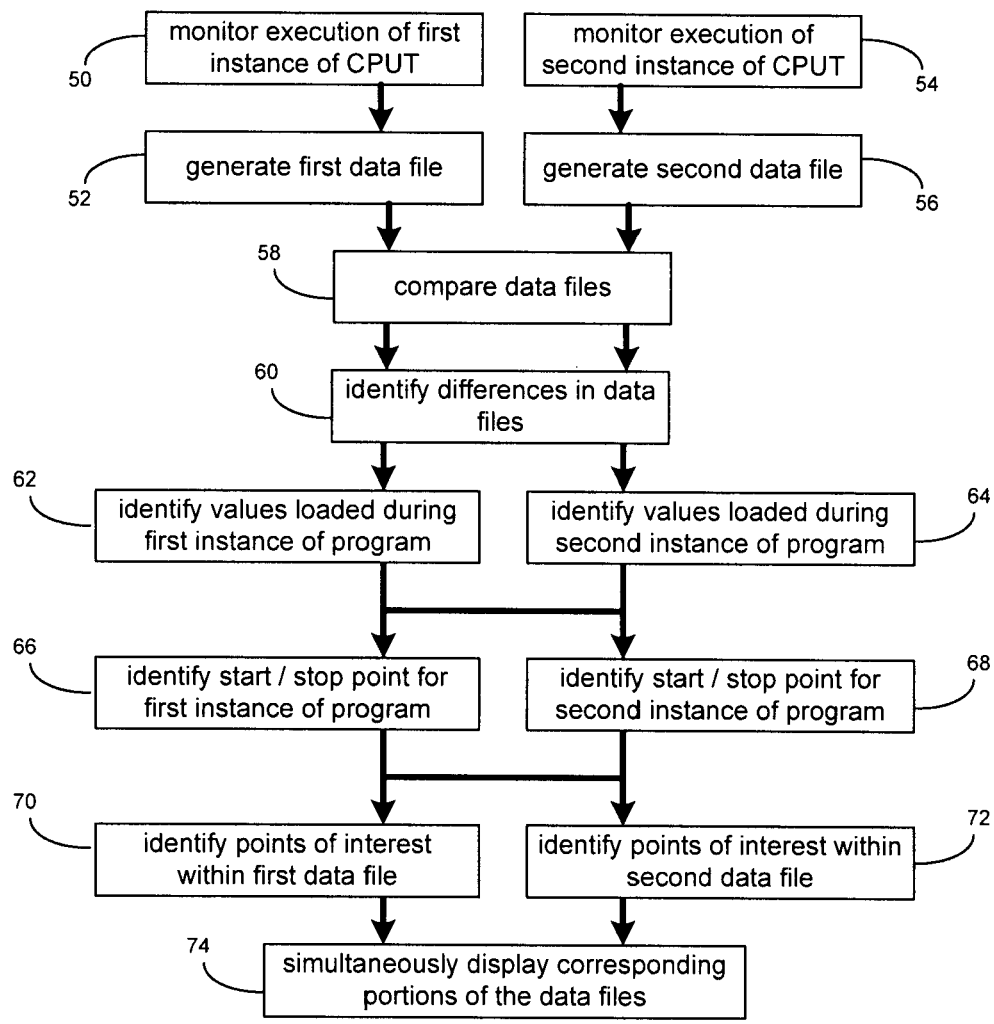
FIG. 2 is a flowchart of the differential comparison process of FIG. 1.

Referring also to FIG. 2 and as discussed above, during execution of first instance 14 of the CPUT, process 10 may monitor 50 the chronological order in which one or more portions of the first instance 14 of the CPUT are executed. Process 10 may generate 52 first data file 16, which may be stored on e.g., storage device 22. The manner in which process 10 monitors 50 the execution of the first instance 14 of the CPUT will be discussed below in greater detail, as will the manner in which first data file 16 is generated 52.

During execution of second instance 18 of the CPUT, process 10 may monitor 54 the chronological order in which one or more portions of the first instance 18 of the CPUT are executed. Process 10 may generate 56 second data file 20, which may be stored on e.g., storage device 22. The manner in which process 10 monitors 54 the execution of the second instance 18 of the CPUT will be discussed below in greater detail, as will the manner in which second data file 20 is generated 56.

Once data files 16, 20 are generated 52, 56 (respectively), data files 16, 20 may be compared 58 to identify 60 differences in the manner in which the second instance 18 of the CPUT was executed, with respect to the first instance 16 of the CPUT.

As will be discussed below in greater detail, once these differences are identified 60 by process 10, the differences may be provided, e.g. to the software developer, to aid in the optimization and improvement of the CPUT by reducing the occurrence of inconsistent behavior between instances (e.g., instances 14, 18) of the CPUT.

Figure 3:
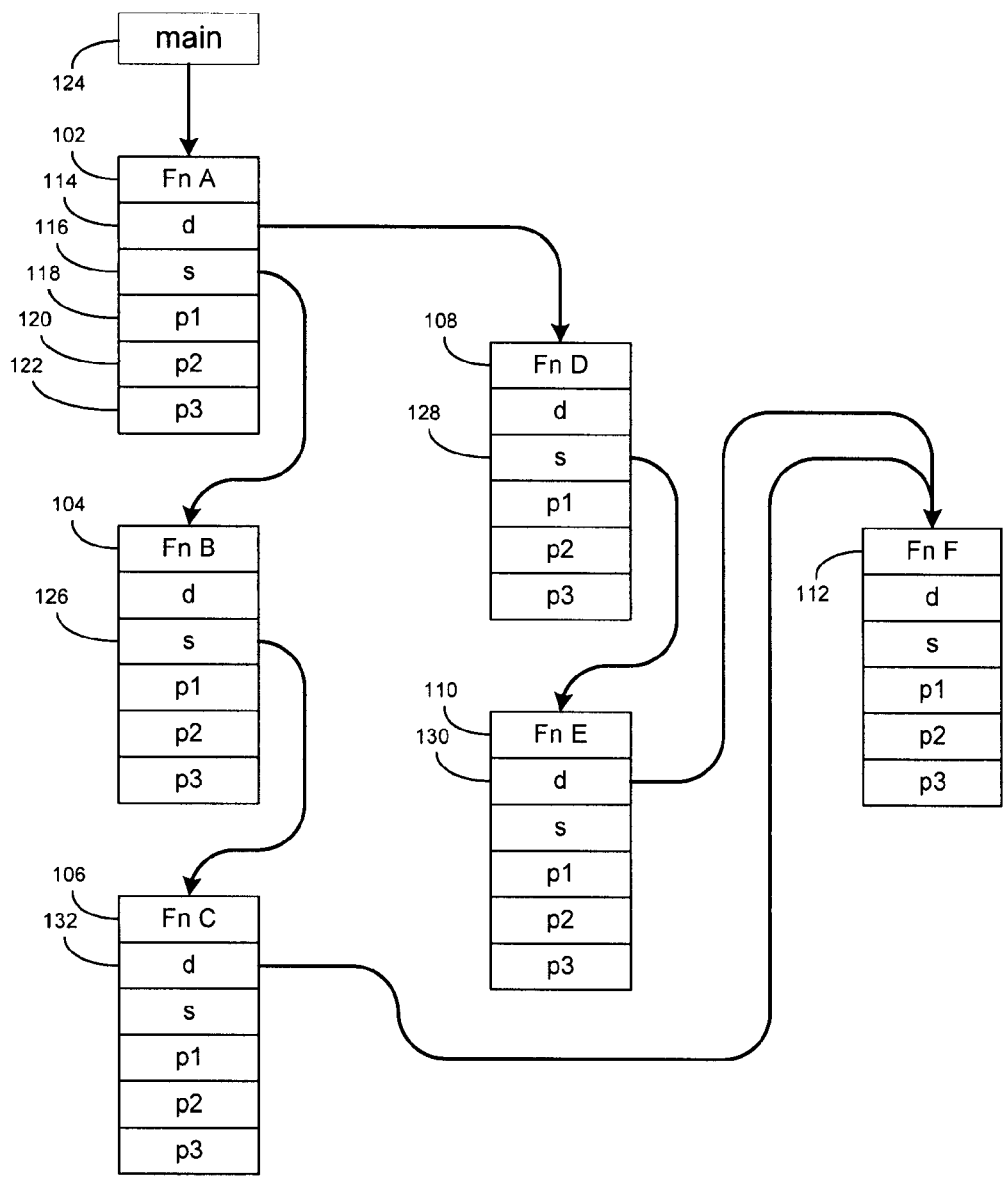
FIG. 3 is a diagrammatic view of a call graph.

Referring also to FIG. 3, there is shown a call graph 100 that provides an illustrative example of the manner in which functions may be called during the first instance 14 and/or second instance 18 of the CPUT. Call graph 100 is shown to include a plurality of stack frames 102, 104, 106, 108, 110, 112, each of which is shown to include a plurality of pointers. For example, stack frame 102 is shown to include five pointers, namely descendant pointer 114, sibling pointer 116, previously-called function pointer 118, basic block set descriptor pointer 120, and parameter structure pointer 122.

Descendant pointer 114 may define functions called by the function in question. Sibling pointer 116 may define functions called simultaneously with the function in question. Previously-called function pointer 118 may define the function that was called just prior to the function in question, thus allowing for establishment of an "order-in-time" that defines a sequence of function calls. Basic block set descriptor pointer 120 may define a basic block set descriptor for the function in question. And parameter structure pointer 122 may define one or more parameters (e.g., arguments and variables) for the function in question.

Assume for illustrative purposes that "Main" 124 calls Function A (illustrated as stack frame 102), Function B (illustrated as stack frame 104), and Function C (illustrated as stack frame 106); Function A (illustrated as stack frame 102) calls Function D (illustrated as stack frame 108), and Function E (illustrated as stack frame 110); Function E (illustrated as stack frame 110) calls Function F (illustrated as stack frame 112); and Function C (illustrated as stack frame 106) calls Function F (illustrated as stack frame 112).

For the calls from "Main" 124 to Function A, Function B and Function C: "Main" is shown to point to stack frame 102 (i.e., the stack frame for Function A); sibling pointer 116 of stack frame 102 is shown to point to stack frame 104 (i.e., the stack frame for Function B); and sibling pointer 126 of stack frame 104 is shown to point to stack frame 106 (i.e., the stack frame for Function C).

For the calls from Function A to Function D and Function E: descendant pointer 114 of stack frame 102 (i.e., the stack frame for Function A) is shown to point to stack frame 108 (i.e., the stack frame for Function D); and sibling pointer 128 of stack frame 108 is shown to point to stack frame 110 (i.e., the stack frame for Function E).

For the call from Function E to Function F: descendant pointer 130 of stack frame 110 (i.e., the stack frame for Function E) is shown to point to stack frame 112 (i.e., the stack frame for Function F).

For the call from Function C to Function F: descendant pointer 132 of stack frame 106 (i.e., the stack frame for Function C) is shown to point to stack frame 112 (i.e., the stack frame for Function E).

Figure 4:
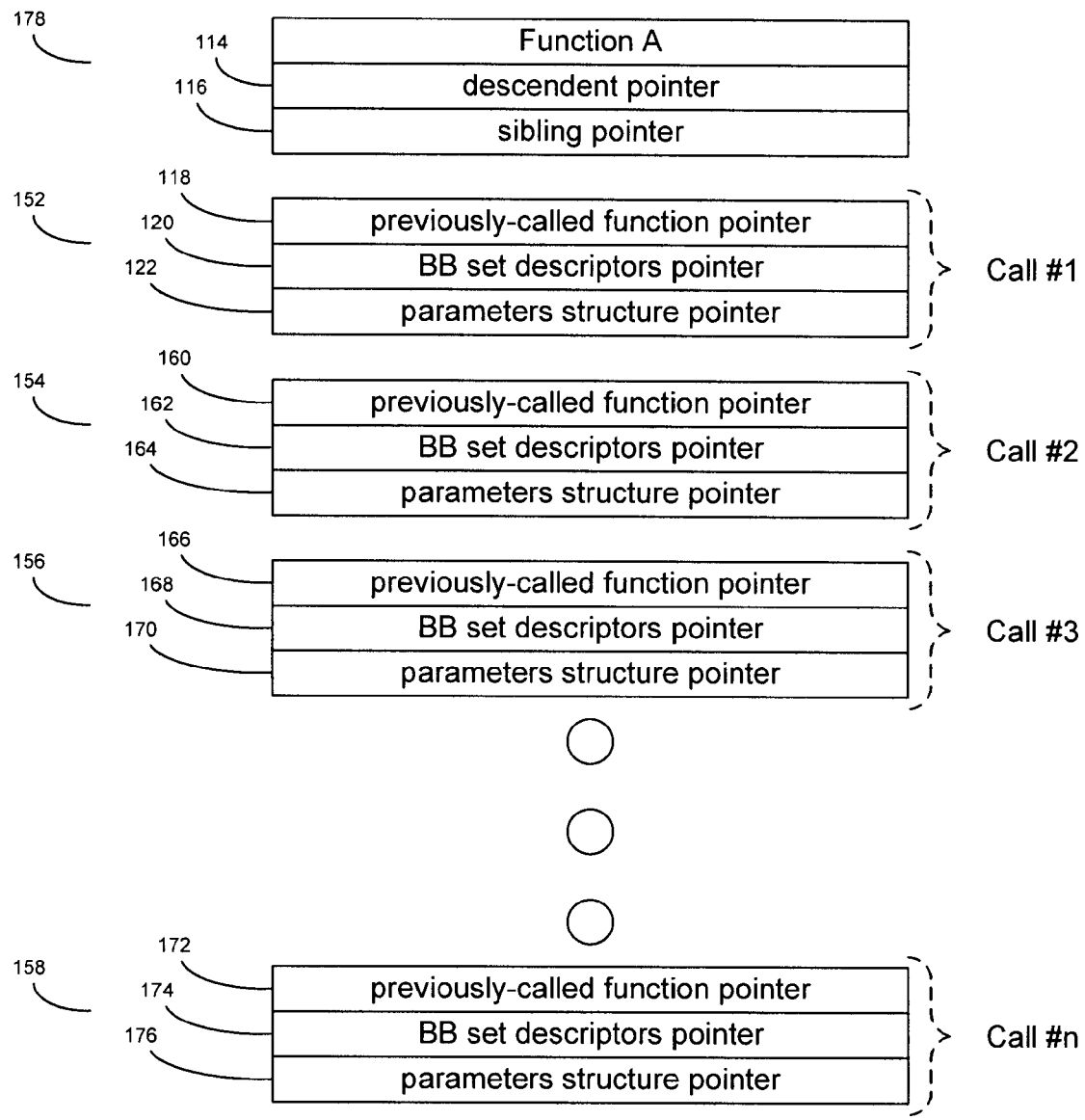
FIG. 4 is a diagrammatic view of a stack frame.

Referring also to FIG. 4, the data included in several of the structures associated with a stack frame (e.g., stack frames 102, 104, 106, 108, 110, 112) may vary when the function in question is called multiple times during e.g., the execution of first instance 14 and/or second instance 18 of the CPUT. Specifically, previously-called function pointer 118, basic block set descriptor pointer 120, and parameter structure pointer 122 may vary (from call to call) when the function in question is called multiple times. However, descendant pointer 114 and sibling pointer 116 may remain constant during multiple calls of the function in question.

Accordingly, previously-called function pointer 118, basic block set descriptor pointer 120, and parameter structure pointer 122 may be grouped together and referred to as a call structure, which may be unique for each call of the function in question. Further, descendant pointer 114 and sibling pointer 116 may be grouped together and referred to as a stack frame structure, which is typically the same for all calls of the function in question. If a function is called multiple times, a list of call structures can be associated with the stack frame structure that corresponds to that function. The list can be ordered by the order-in-time in which each call occurred. A complete sequence of function calls can be generated, in the order in which they have occurred during actual execution, by following the list of previously-called function pointers back to its beginning and building up a list of calls in the reverse of that order. This list may thread through the call structures associated with various stack frames. If memory becomes constrained because of the accumulation of call structures, the oldest call structures can be identified (by walking to the beginning of the list) and purged, but this may cause data loss in such a way as to effectively move the recorded start point forward in time.

For example, assume that Function A is called "n" times. Accordingly, stack frame 102 may be associated with a list of "n" call structures (illustrated as call structure 152, 154, 156, 158). Call structure 152 may include previously-called function pointer 118, basic block set descriptor pointer 120, and parameter structure pointer 122. Call structure 154 may include previously-called function pointer 160, basic block set descriptor pointer 162, and parameter structure pointer 164. Call structure 156 may include previously-called function pointer 166, basic block set descriptor pointer 168, and parameter structure pointer 170. Call structure 158 may include previously-called function pointer 172, basic block set descriptor pointer 174, and parameter structure pointer 176. Additionally, stack frame 102 may include stack frame structure 178 (which may include descendant pointer 114 and sibling pointer 116).

As discussed above, differential comparison process 10 may allow a software developer to execute multiple instances (e.g., instances 14, 18) of a CPUT to determine why the CPUT demonstrates e.g., inconsistent performance behavior. For example, one instance of a CPUT executed on a first version of an operating system may perform differently from another instance of the same CPUT executed on a second version of the same operating system. Further, a first instance of a CPUT executed on a first computer platform may perform differently from another instance of the same CPUT executed on a second computer platform. Additionally, a CPUT may simply perform or behave differently each time that CPUT is executed on the same platform.

When monitoring 50 execution of first instance 14 of a CPUT and generating 52 first data file 16, first data file 16 may be saved on the platform executing the first instance 14 of the CPUT. For example, the first instance of the CPUT may be executed on a first computing platform (not shown). First data file 16 may be saved locally on the platform executing the first instance of the CPUT. First data file 16 may subsequently be transferred to analysis computer 12 for comparison 58 with second data file 20.

When monitoring 54 execution of second instance 18 of the CPUT and generating 56 second data file 20, second data file 20 may be saved on the platform executing the second instance 18 of the CPUT. For example, the second instance of the CPUT may be executed on a second computing platform (not shown). Second data file 20 may be saved locally on the platform executing the instance of the CPUT and subsequently transferred to analysis computer 12 for comparison 58 with first data file 16.

In order to monitor 50 execution of first instance 14 of the CPUT and generate 52 first data file 16, differential comparison process 10 (or a portion thereof) may need to be installed and executed on the first computing platform (not shown). Further, in order to monitor 54 execution of second instance 18 of the CPUT and generate 56 second data file 20, differential comparison process 10 (or a portion thereof) may need to be installed and executed on the second computing platform (not shown).

Data File Generation

When monitoring 50, 54 execution of the various instances (e.g., instances 14, 18) of a CPUT and generating 52, 56 the data files (e.g., first data file 16 and second data file 18) for comparison 58, differential comparison process 10 may perform one of more sub-processes, each of which will be discussed below in greater detail.

Figure 5:
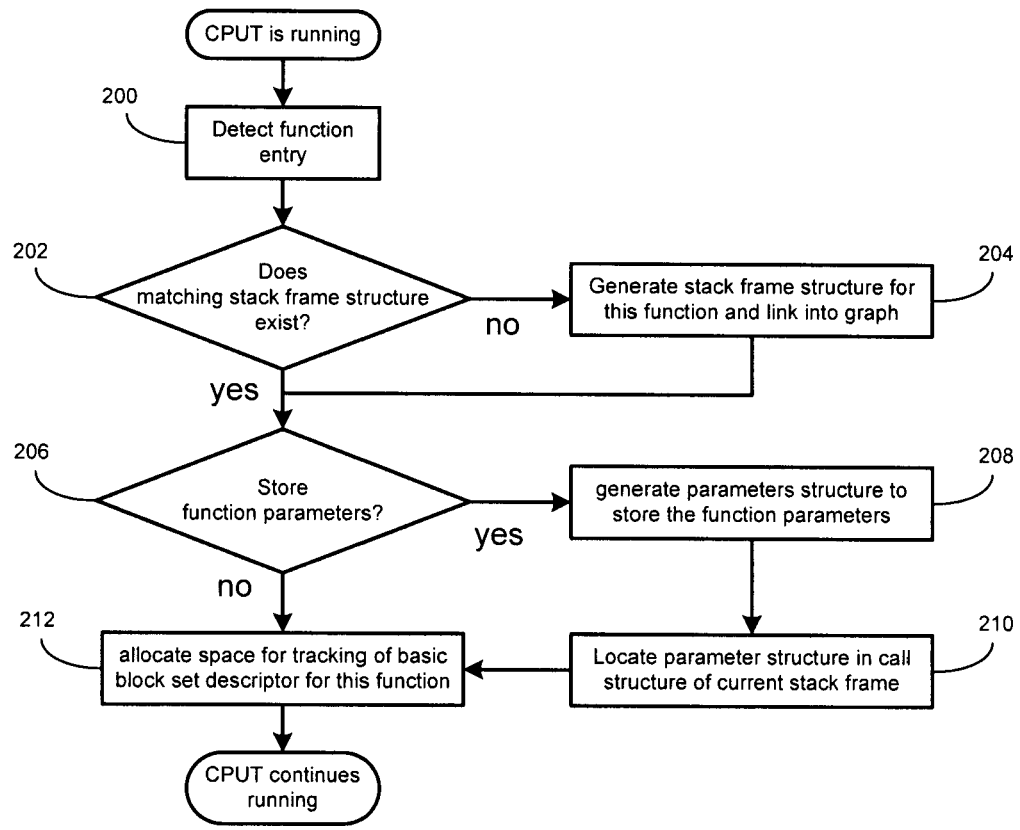
FIG. 5 is a flowchart of a portion of the differential comparison process of FIG. 1.

Referring also to FIG. 5, differential comparison process 10 may detect 200 the calling of a function. Once detected, process 10 may determine 202 whether a matching stack frame structure (e.g., stack frame structure 178, FIG. 4) exists for the called function. As discussed above, when a function is called multiple times, the call structure (e.g., call structures 152, 154, 156, 158) may vary for each time that the function is called. However, the stack frame structure (e.g., stack frame structure 178, FIG. 4) for a function typically remains constant from multiple function calls.

Accordingly, by determining 202 whether there is a matching stack frame structure for the called function, process 10 is checking to see whether the called function was ever called before. If 202 a matching stack frame structure is not found, process 10 may generate 204 a stack frame structure for the called function. Additionally, process 10 may link 204 this newly-created stack frame structure to the call graph. For example, if Function D (represented by stack frame 108, FIG. 3) is called for the first time by Function A (represented by stack frame 102), and if Function A has no other descendant functions as yet, then process 10 may link 204 stack frame 108 to stack frame 102 by setting the descendant member of stack frame 102 to reference stack frame 108. As another example, if Function E (represented by stack frame 110) is subsequently called for the first time by Function A, then process 10 may link 204 stack frame 110 to stack frame 108 by setting the sibling member of stack frame 108 to reference stack frame 110.

Process 10 may determine 206 whether the user (e.g., the software developer executing process 10) wishes to store function parameters. This may be determined 206 by examining one or more options selected by the user when initiating the execution of process 10. Examples of function parameters may include, but are not limited to, pointers or references passed as function arguments, strings or other values pointed to or referenced by those pointers or references, or discrete values such as integers and bitfields that may be passed as parameters to a function. If the function parameters are indeed being stored, process 10 may generate 208 a parameter structure (not shown) for storing the function parameters, which may be stored on a storage device (e.g., storage device 22) coupled to the computing device (e.g., analysis computer 12) executing the instance of the CPUT, as data associated with a function call associated with a stack frame that forms part of the call graph. Process 10 may define 210 the location of the parameter structure using e.g., parameter structure pointer 122 included within e.g., call structure 152 of stack frame 102. As discussed above, being that the data defined within a call structure is typically different each time that a function is called, in the event that e.g., Function A is called a second time, a second call structure (e.g., call structure 154) may be defined and a second location (for the parameter structure) may be allocated e.g., to store parameter structure pointer 164 included within call structure 154.

Regardless of whether function parameters are being stored, process 10 may allocate 212 space for tracking the basic block set descriptors for the called function (e.g., Function A as represented by stack frame 102, FIG. 3). Basic blocks are contiguous sets of machine instructions that do not include any jumps (out of the basic block) or targets (into the basic block) other than those positioned at the very end or very beginning (respectively) of the basic block. A function may include one or more basic blocks that may execute in a programmatically-controlled order when the function is called. The ordered set of basic blocks utilized by the called function, as a result of a particular invocation of that function, may be uniquely defined using a basic block set descriptor pointer (e.g., basic block set descriptor pointer 120) included within a call structure (e.g., call structure 152). The manner in which process 10 defines a basic block set descriptor for a called function may be explained by the following example.

Assume (for illustrative purposes) that Function A defines five basic blocks (e.g., BB1, BB2, BB3, BB4, BB5) that may be used during various calls of Function A. Assume that for the first call of Function A, the basic blocks are executed in the following sequence (BB1, BB3, BB5, BB4, BB2). Further assume that for a second call of Function A, the basic blocks are executed in a different sequence, namely BB1, BB3, BB5, BB2, BB4). Process 10 may define the basic block set descriptors using various formats, examples of which may include, but are not limited to, a bit array (containing as many columns as there are basic blocks that may be executed in the function, and containing a row for each actual execution of a basic block during a given call to the function; one bit would typically be set, per row, to indicate the order of basic block execution during the call) or a sequence of unsigned short integers. If process 10 stores the basic block set descriptors as a sequence of unsigned short integers, process 10 may compress the sequence of unsigned short integers to save storage space. Examples of the type of compression algorithms usable by process 10 to compress the sequence of unsigned integers may include, but are not limited to the LZW (Lempel-Ziv-Welch) lossless compression algorithm.

If process 10 uses unsigned integers to define a basic block set descriptor for the first and second calls of Function A, process 10 may define a basic block set descriptor for Function A (first call) as "1, 3, 5, 4, 2" and process 10 may define a basic block set descriptor for Function A (second call) as "1, 3, 5, 2, 4". As discussed above, these sequences of unsigned short integers may be compressed using a known compression algorithm, to provide a unique value or bit sequence that represents a particular traversal through the function's basic blocks.

Figure 6:
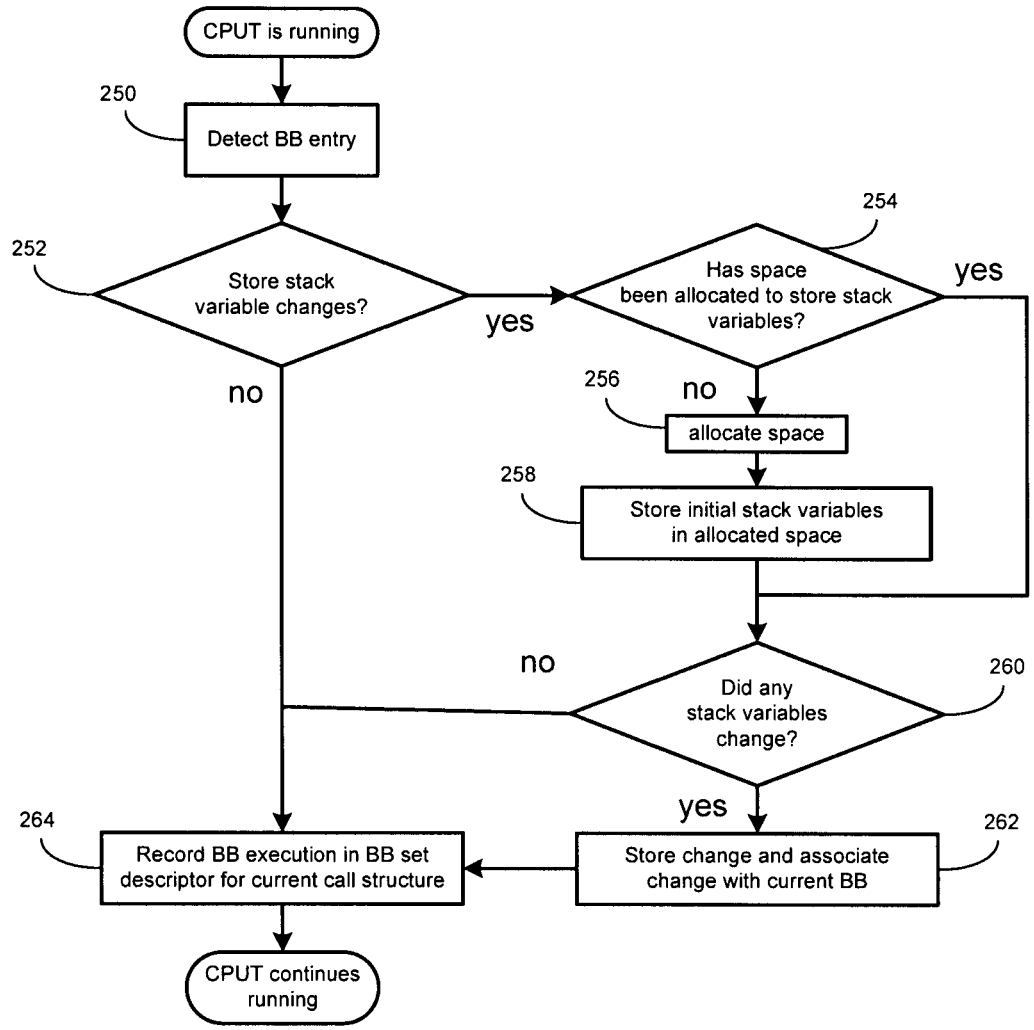
FIG. 6 is a flowchart of a portion of the differential comparison process of FIG. 1.

Referring also to FIG. 6, differential comparison process 10 may detect 250 the entry of a basic block. For example and continuing with the above-stated example, the first time that Function A is called, basic block BB1 may be executed. Accordingly, upon process 10 detecting 250 that basic block BB1 is being executed, process 10 may determine 252 whether the user (e.g., the software developer executing process 10) wishes to store program variable changes. Again, this may be determined 252 by examining one or more options selected by the user when initiating the execution of process 10. Examples of the program variables that may be stored (e.g., to determine which changes have occurred from one execution of the CPUT to the next) may include, but are not limited to, stack variables, local variables, static variables, and potentially variables at non-function scope as well and/or the entire set of values loaded and stored by each basic block.

If the stack variable changes are to be stored, process 10 may determine 254 whether storage space has been allocated to store the current state of the stack variables (i.e., so that the stack variable changes may be subsequently determined). If storage space has not been allocated, process 10 may allocate 256 storage space for e.g., storing the current state of the stack variables. The storage space may be allocated 256 on a storage device (e.g., storage device 22) coupled to the computing device (e.g., analysis computer 12) executing the instance of the CPUT. Once storage space has been allocated 256, process 10 may store 258 the current state of the stack variables.

Continuing with the above-stated example, assume that, when storing stack variable changes, process 10 is storing (among other things) one or more local variables. For example, assume that Basic Block BB1 has local variables defined as "A=1, B=3, C=5, D=4". Accordingly for the first time that Function A is called and Basic Block BB1 is executed, process 10 may use machine-specific instructions to determine the stack memory location in which these variables are stored. Process 10 may store the current state of the stack variables into temporary memory allocated for the storing stack variable values and associated with the relevant call structure, which includes stack variables "A=1, B=3, C=5, D=4". Further, assume that as Function A continues to be executed, Basic Block BB3 (i.e., the next basic block in the sequence of basic blocks to be executed during the first call of Function A) is executed and the stack variables' values are modified such that process 10 now has stack variable values "A=1, B=3, C=5, D=5". Process 10 may compare, among other things, the current basic block variables "A=1, B=3, C=5, D=5" (i.e., the variable values at Basic Block BB3) with the previously-stored stack variable values "A=1, B=3, C=5, D=4" (i.e., the variable values at Basic Block BB1) to determine 260 whether any stack variable values have changed. In this case, the last variable (i.e., Variable D) of the stack variables has changed. Upon determining 260 that such a change has occurred, process 10 may store 262 the change information (i.e., the difference) and associate the change with the current basic block. For example, process 10 may represent the change from previously-stored stack variable values "A=1, B=3, C=5, D=4" to the current stack variable values "A=1, B=3, C=5, D=5" as e.g., "0, 0, 0, 5" (where 0, 0, 0, 0 would represent no change). To associate this record with a given basic block, a basic block numbering scheme may be applied to the record, where the relevant basic block is identified by a first value in the sequence, e.g. "3, 0, 0, 0, 5". As with the basic block set descriptors, these sequences can be stored in a compressed format in a space allocated for permanent storage of variable states and associated with the call structure. This example of the manner in which process 10 identifies the change between e.g., stack variables is for illustrative purposes only and is not intended to be a limitation of this disclosure. Accordingly, once the change is defined (e.g., "0, 0, 0, 5"), the change may be stored 262 and associated with the current basic block (e.g., Basic Block BB3) being processed by process 10. Representation of strings, structures, and other complex variable types may be arranged by simply storing and compressing the contents of the stack memory associated with the function. In the interest of minimizing the size of the data set, a lossy compression scheme may be applied for the storage of stack variable values. Storage of non-function scope variable values may also be achieved; this will require locating the CPUT's storage for the desired variables, saving their initial values and changes in temporary space, in a manner similar to that described for stack variable (above), and subsequently associating a compressed form of this stored data with the relevant basic blocks that are associated with each call structure.

Process 10 may then record 264 the execution of e.g., Basic Block BB3 in e.g., the basic block set descriptor for the current call structure (e.g., call structure 152).

Figure 7:
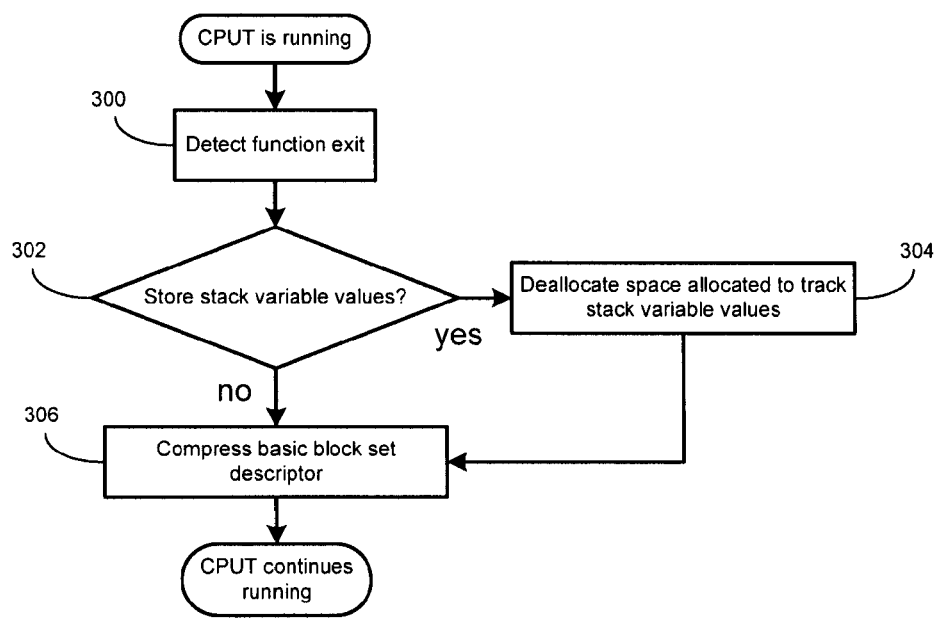
FIG. 7 is a flowchart of a portion of the differential comparison process of FIG. 1.

Referring also to FIG. 7, process 10 may detect 300 a function exit and determine 302 whether the user wished to store stack variable values. This may be determined 302 by examining one or more options selected by the user when initiating the execution of process 10. If the stack variable values were indeed stored, process 10 may deallocate 304 any temporary storage space previously allocated (See Item 256, FIG. 6) for storing the uncompressed stack variable values during execution of the function in question. As discussed above, the basic block descriptors may be compressed to save storage space, and so may any saved variable values, or the saved set of all loaded and stored values. Accordingly, process 10 may compress 306 the basic block descriptors discussed above. Process 10 may be continued and repeated until the instance of the CPUT being tested (or the portion thereof) is completely executed. Once execution is completed, the data file describing the executed instance (or the portion thereof) of the CPUT may be complete and ready for comparison 58.

Referring again to FIG. 2, in response to the data file comparison 58, process 10 may identify one or more differences between the chronological order in which one or more portions of the first instance of the CPUT are executed and the chronological order in which one or more portions of the second instance of the CPUT were executed. For example, if both instances 14, 18 of the CPUT executed identically, then data file 16 and data file 20 would also be identical. However, by comparing data file 16 and data file 20, process 10 may identify the differences in e.g., the manner in which the first instance 14 of the CPUT executed with respect to the manner in which the second instance 18 of the CPUT executed.

Further, by examining first data file 16, function parameters and stack variables specified during execution of the first instance of the CPUT may be identified 62. Additionally, by examining second data file 20, function parameters and stack variables specified during execution of the second instance of the CPUT may be identified 64.

As the size of data files 16, 20 may be considerably large, process 10 may allow the user to define 66, 68 start/stop points within data files 16, 20 (respectively). For example, if the problems associated with the CPUT are isolated to the print functionality of the program, process 10 may allow the user (e.g., the software developer) to define start/stop points that limit the comparison 58 and identification 60 processes of process 10 to only the area within the data file that the user is interested in (i.e., areas proximate to the print functionality).

Additionally process 10 may allow the user to identify 70, 72 one or more points of interest within first data file 16 and/or second data file 20 (respectively). Process 10 may further allow one or more corresponding portions of first data file 16 and second data file 20 to be simultaneously displayed (74) (in e.g., a split screen arrangement) on a monitor (not shown) coupled to analysis computer 12).

Display of Results

Two views of the run comparison output may be useful. The first view may appear in a sort of collapsible format. Suppose that there are two runs of a program that loads a number of modules (e.g., an EXE and some DLLs). The top-level view of this run comparison may show just the module names, with color highlighting to indicate the modules in which there are differences in the order of execution or in the variable values stored. There may be right-side/left-side view panels that may be different if a different set of functions was executed for the two runs. Color highlighting may indicate the common functions in which there are notable differences from run to run. Each function may be associated with an icon that would allow it be "opened" so that its lines of code could be loaded and viewed. This may show differences in the executed lines of code in right-side/left-side source code views that are colored as at the higher levels and annotated to show the number of times each source line was executed. This first proposed way of looking at the differential output is not very different from views that can be shown in contemporary code coverage tools.

A second view may show functions in their order of execution. For a large program, this may look like a long list of functions in the right-side/left-side panels. As with source code comparison tools, the GUI may provide an easy means of skipping from one difference to the next, to aid in navigation of this potentially long list. There should also be a way to jump between points of interest identified by the user, to aid navigation. As with the first view, the user could "open" a function to see its annotated source code. A user scrolling through this second view may be able to follow the path of execution for each run and observe which code was executed differently as the runs progressed. As with a source code (text) diff tool, there may be a way to navigate such that large sections of code that execute identically can be skipped.

There may also be a way for the user to indicate to the tool that some differences, such as a set of event-driven functions, may be skipped in this navigation, too. These might then appear in a unique color, or they might be "hidden" from view. Selection of such functions might best be done in the first view (described in the previous paragraph). Switching between the first view and the second view may be as easy as selecting a line in the current view and choosing a context menu item to switch to the corresponding "place" in the other view.

If variable values, or loaded and stored data values, were collected for the runs, then the above two views would show differences based on these values. At the module and function levels, the user might expect to see more total differences when loaded and stored values have been recorded than there would be otherwise. The additional differences would be the result of variations in the loaded and stored values themselves. At the annotated source level, the source code could be further annotated to show the values that were associated with each variable for each line of code, for the two runs. This display of differences based on loaded and stored values would be primarily useful when a diff based on executed basic blocks does not reveal significant points of departure in the two runs.

A number of implementations have been described. Nevertheless, it will be understood that various modifications may be made. Accordingly, other implementations are within the scope of the following claims.

What is claimed is:

1. A differential comparison method comprising:
monitoring, via a computing device, a chronological order in which stack frame pointers are added to a stack frame as one or more portions of a first instance of a computer program are executed, thus generating a first data file;
monitoring, via the computing device, the chronological order in which stack frame pointers are added to the stack frame as one or more portions of a second instance of the computer program are executed, thus generating a second data file;
detecting invocation of a function associated with the first instance and second instance;
determining whether a matching stack flame structure exists for the function;
if the matching stack frame structure does not exist, generating a stack frame structure for the function and adding the stack frame structure to the stack frame, wherein the stack frame structure includes a descendant pointer and a sibling pointer;
comparing, via the computing device, the chronological order in which stack frame pointers were added to the stack frame according to the first and second data files; and
in response to the data file comparison, identifying, via the computing device, one or more differences between the chronological order in which stack frame pointers were added to the stack frame as the one or more portions of the first instance of the computer program were executed and the chronological order in which stack frame pointers were added to the stack frame as the one or more portions of the second instance of the computer program were executed.

2. The method of claim 1 further comprising:
identifying one or more data values loaded and stored during execution of the first instance of the computer program.

3. The method of claim 1 further comprising:
identifying one or more data values loaded and stored during execution of the second instance of the computer program.

4. The method of claim 1 further comprising:
identifying one or more of a monitoring start point and a monitoring stop point within the first instance of the computer program.

5. The method of claim 1 further comprising:
identifying one or more of a monitoring start point and a monitoring stop point within the second instance of the computer program.

6. The method of claim 1 further comprising:
identifying one or more points of interest within the first data file; and
identifying one or more points of interest within the second data file.

7. The method of claim 1 wherein the one or more portions of the first instance of the computer program include one or more of functions and basic blocks.

8. The method of claim 1 wherein the one or more portions of the second instance of the computer program include one or more of functions and basic blocks.

9. The method of claim 1 further comprising:
simultaneously displaying one or more corresponding portions of the first data file and the second data file.

10. The method of claim 1 wherein monitoring the chronological order in which stack frame pointers are added to a stack frame as one or more portions of the first instance of the computer program are executed includes:
determining whether a matching call graph entry exists for the function and, if not, generating a call graph entry for the function.

11. The method of claim 1 wherein monitoring the chronological order in which stack frame pointers are added to a stack frame as one or more portions of the first instance of the computer program are executed includes:
determining whether one or more parameters of the function are to be stored and, if so, generating a data structure to store the one or more parameters of the function; and
allocating space for tracking one or more descriptors for the set of basic blocks executed because of an invocation of the function.

12. The method of claim 1 wherein monitoring the chronological order in which stack frame pointers are added to a stack frame as one or more portions of the second instance of the computer program are executed includes:
determining whether a matching call graph entry exists for the function and, if not, generating a call graph entry for the function.

13. The method of claim 1 wherein monitoring the chronological order in which stack frame pointers are added to a stack frame as one or more portions of the second instance of the computer program are executed includes:
determining whether one or more parameters of the function are to be stored and, if so, generating a data structure to store the one or more parameters of the function; and
allocating space for tracking one or more descriptors for the set of basic blocks executed because of an invocation of the function.

14. The method of claim 1 wherein monitoring the chronological order in which stack frame pointers are added to a stack frame as one or more portions of the first instance of the computer program are executed includes:
detecting entry of a basic block; and
determining whether one or more stack variable changes or other loaded and stored values changes are to be stored and, if so, allocating space for storing the one or more stack variable or other loaded and stored value changes.

15. The method of claim 14 wherein monitoring the chronological order in which stack frame pointers are added to a stack frame as one or more portions of the first instance of the computer program are executed further includes:
determining whether one or more stack variables or other loaded and stored values changed and, if so, storing a difference value and associating the difference value with the basic block; and
recording the execution of the basic block as part of the basic block set descriptor associated with a particular call to a particular function tracked in the call graph.

16. The method of claim 1 wherein monitoring the chronological order in which stack frame pointers are added to a stack frame as one or more portions of the second instance of the computer program are executed includes:
detecting entry of a basic block; and
determining whether one or more stack variable changes or other loaded and stored value changes are to be stored and, if so, allocating space for storing the one or more stack variable changes or other loaded and stored value changes.

17. The method of claim 16 wherein monitoring the chronological order in which stack frame pointers added to the stack frame as one or more portions of the second instance of the computer program are executed further includes:
determining whether the one or more stack variables or other loaded and stored values changed and, if so, storing a difference value and associating the difference value with the basic block; and
recording the execution of the basic block as part of the basic block set descriptor associated with a particular call to a particular function tracked in the call graph.

18. A computer program product comprising a non-transitory computer readable medium including a computer readable program, wherein the computer readable program when executed on a computer causes the computer to:
monitor a chronological order in which stack frame pointers are added to a stack frame, as one or more portions of a first instance of a computer program are executed, thus generating a first data file;
monitor the chronological order in which stack frame pointers are added to the stack frame as one or more portions of a second instance of the computer program are executed, thus generating a second data file;
detecting invocation of a function associated with the first instance and second instance;
determining whether a matching stack frame structure exists for the function;
if the matching stack frame structure does not exist, generating a stack frame structure for the function and adding the stack frame structure to the stack frame, wherein the stack frame structure includes a descendant pointer, a sibling pointer, and a previously-called pointer;
comparing the chronological order in which stack frame pointers were added to the stack frame of the first and second data files; and
in response to the data file comparison, identifying one or more differences between the chronological order in which stack flame pointers were added to the stack flame as one or more portions of the first instance of the computer program are executed and the chronological order in which stack flame pointers were added to the stack flame as one or more portions of the second instance of the computer program are executed.

19. The computer program product of claim 18 further comprising instructions for:
    identifying one or more data values loaded and stored during execution of the first instance of the computer program.

20. The computer program product of claim 18 further comprising instructions for:
    identifying one or more data values loaded and stored during execution of the second instance of the computer program.

21. The computer program product of claim 18 further comprising instructions for:
    identifying one or more of a monitoring start point and a monitoring stop point within the first instance of the computer program.

22. The computer program product of claim 18 further comprising instructions for:
    identifying one or more of a monitoring start point and a monitoring stop point within the second instance of the computer program.

23. The computer program product of claim 18 further comprising instructions for:
    identifying one or more points of interest within the first data file; and
    identifying one or more points of interest within the second data file.

24. The computer program product of claim 18 wherein the one or more portions of the first instance of the computer program include one or more of functions and basic blocks.

25. The computer program product of claim 18 wherein the one or more portions of the second instance of the computer program include one or more of functions and basic blocks.

26. The computer program product of claim 18 further comprising instructions for:
    simultaneously displaying one or more corresponding portions of the first data file and the second data file.

27. The computer program product of claim 18 wherein the instructions for monitoring the chronological order in which stack frame pointers are added to a stack frame, as one or more portions of a first instance of a computer program are executed includes instructions for associating chronological data of stack frame pointers added to the stack frame with function calls in a stored call graph by:
    determining whether a matching stack frame structure exists for the function and, if not, generating a stack frame structure for the function.

28. The computer program product of claim 18 wherein the instructions for monitoring the chronological order in which stack frame pointers are added to a stack frame, as one or more portions of a first instance of a computer program are executed further includes instructions for:
    determining whether one or more parameters of the function are to be stored and, if so, generating a data structure to store the one or more parameters of the function; and
    allocating space for tracking one or more descriptors for the set of basic blocks executed because of an invocation of the function.

29. The computer program product of claim 18 wherein the instructions for monitoring the chronological order in which stack frame pointers are added to the stack frame as one or more portions of the second instance of the computer program are executed includes instructions for:
    determining whether a matching call graph entry exists for the function and, if not, generating a call graph entry for the function.

30. The computer program product of claim 18 wherein the instructions for monitoring the chronological order in which stack frame pointers are added to the stack frame as one or more portions of the second instance of the computer program are executed further includes instructions for:
    determining whether one or more parameters of the function are to be stored and, if so, generating a parameter structure to store the one or more parameters of the function; and
    allocating space for tracking one or more basic block set descriptors for the function.

31. The computer program product of claim 18 wherein the instructions for monitoring the chronological order in which stack frame pointers are added to the stack frame as one or more portions of the first instance of the computer program are executed includes instructions for:
    detecting entry of a basic block; and
    determining whether one or more stack variable changes or other loaded and stored value are to be stored and, if so, allocating space for storing the one or more stack variable changes or other loaded and stored value changes.

32. The computer program product of claim 31 wherein the instructions for monitoring the chronological order in which stack frame pointers are added to the stack frame as one or more portions the first instance of the computer program are executed further includes instructions for:
    determining whether the one or more stack variables or other loaded and stored values changed and, if so, storing a difference value and associating the difference value with the basic block; and
    recording the execution of the basic block as part of the basic block set descriptor associated with a particular call to a particular function tracked in the call graph.

33. The computer program product of claim 18 wherein the instructions for monitoring the chronological order in which stack frame pointers are added to the stack frame as one or more portions of the second instance of the computer program are executed includes instructions for:
    detecting entry of a basic block; and
    determining whether one or more stack variable changes or other loaded and stored values are to be stored and, if so, allocating space for storing the one or more stack variable changes or other loaded and stored value changes.

34. The computer program product of claim 33 wherein the instructions for monitoring the chronological order in which stack frame pointers are added to the stack frame as one or more portions of the second instance of the computer program are executed further includes instructions for:
    determining whether the one or more stack variables or other loaded and stored values changed and, if so, storing a difference value and associating the difference value with the basic block; and
    recording the execution of the basic block as part of the basic block set descriptor associated with a particular call to a particular function tracked in the call graph.

* * * * *